(12) United States Patent
Lee et al.

(10) Patent No.: US 7,107,007 B1
(45) Date of Patent: Sep. 12, 2006

(54) POSITIONING SYSTEM FOR A GEOSTATIONARY SATELLITE

(75) Inventors: Sang-Cherl Lee, Daejeon (KR); Bang-Yeop Kim, Daejeon (KR); Bong-Kyu Park, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 11/250,992

(22) Filed: Oct. 14, 2005

(51) Int. Cl.
*H04B 7/185* (2006.01)

(52) U.S. Cl. .................. 455/13.1; 342/355; 701/13

(58) Field of Classification Search .......... 342/357.01, 342/356
See application file for complete search history.

(56) References Cited

U.S. PATENT DOCUMENTS

| | | | | |
|---|---|---|---|---|
| 3,340,531 A | * | 9/1967 | Kefalas et al. | 342/353 |
| 3,349,398 A | * | 10/1967 | Werth | 342/353 |
| 3,497,807 A | * | 2/1970 | Newton | 455/13.1 |
| 5,678,175 A | * | 10/1997 | Stuart et al. | 455/13.1 |
| 5,906,337 A | * | 5/1999 | Williams et al. | 244/158.4 |
| 5,984,238 A | * | 11/1999 | Surauer et al. | 244/171 |
| 6,023,605 A | * | 2/2000 | Sasaki et al. | 455/12.1 |
| 6,339,707 B1 | * | 1/2002 | Wainfan et al. | 455/427 |
| 6,341,249 B1 | * | 1/2002 | Xing et al. | 701/13 |
| 6,431,496 B1 | * | 8/2002 | Salvatore | 244/158.6 |
| 2002/0038840 A1 | * | 4/2002 | Maeda et al. | 244/158 R |
| 2002/0196180 A1 | * | 12/2002 | Chang | 342/357.06 |
| 2003/0098810 A1 | * | 5/2003 | Lee et al. | 342/357.06 |

* cited by examiner

*Primary Examiner*—Rafael Perez-Gutierrez
*Assistant Examiner*—Fayyaz Alam
(74) *Attorney, Agent, or Firm*—Volpe And Koenig, P.C.

(57) ABSTRACT

A positioning system for a geostationary satellite according to the present invention comprises a plurality of outer orbit satellites revolving around the earth in equatorial orbit and polar orbit having higher altitude than that of the geostationary satellite; and at least one control station performing orbit determination using tracking data for the outer orbit satellites, and then transmitting consequent orbit data to the outer orbit satellites. The outer orbit satellites transmit to the geostationary satellite their own navigation data, clock data and correction data generated using the orbit data received from the control station. The geostationary satellite calculates its own position using the navigation data, the clock data and the correction data, and performs position control and attitude control autonomously with onboard sensors and actuators.

14 Claims, 5 Drawing Sheets

POSITIONING SYSTEM FOR A GEOSTATIONARY SATELLITE

BACKGROUND OF THE INVENTION

The present invention relates to a system that can perform position determination for a geostationary satellite.

In general, geostationary satellites are designed and manufactured to perform their functions autonomously using an onboard computer, sensors and actuators without aid of a control station. However, orbit determination, station keeping and orbit maneuver of the satellite are possible only with aid of a control station. Orbit determination precision of the satellite is not high because the satellite revolves around the earth at the same angular velocity as that for the rotation of the earth on its axis and so the satellite looks stopped when it is observed from the control station. In addition, several dozens of people and lots of money are needed to maintain the satellite until its life is over.

A global positioning system (GPS) of the United States or global navigation satellite system (GLONASS) of Russia is not useful for position determination for the geostationary satellite having higher orbit than that for the above systems because satellites of the above systems have antennas towards the earth on their orbits.

SUMMARY OF THE INVENTION

To overcome the deficiencies of the prior art, applicants have invented a positioning system for a geostationary satellite using outer orbit satellites having higher altitude than that of the geostationary satellite.

An object of the present invention is to provide a positioning system for a geostationary satellite that causes the satellite to perform its functions autonomously without aid of its own control station until a life of the satellite is over.

In order to achieve the object, a positioning system for a geostationary satellite according to the present invention comprises a plurality of outer orbit satellites revolving around the earth in equatorial orbit and polar orbit having higher altitude than that of the geostationary satellite; and at least one control station performing orbit determination using tracking data for the outer orbit satellites, and then transmitting consequent orbit data to the outer orbit satellites.

The outer orbit satellites transmit to the geostationary satellite their own navigation data, clock data and correction data generated using the orbit data received from the control station.

The geostationary satellite calculates its own position using the navigation data, the clock data and the correction data, and performs position control and attitude control autonomously with onboard sensors and actuators.

DESCRIPTION OF THE PREFERRED EMBODIMENT

Hereinafter, referring to the following appended drawings, the preferred embodiments of the present invention will be explained in detail.

Figure 3:
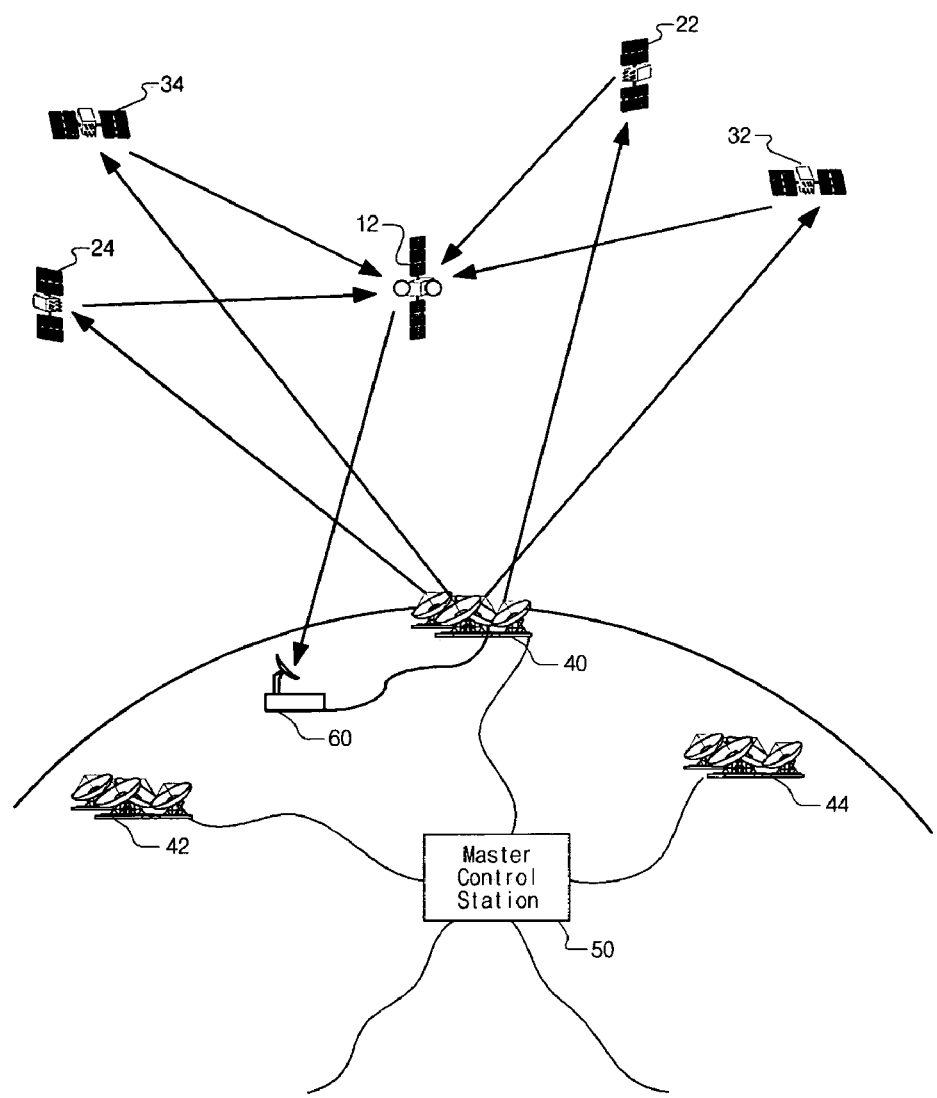
FIG. 3 is a view showing configuration with ground segment of a positioning system for a geostationary satellite according to a preferred embodiment of the present invention.

Referring to FIG. 3, a positioning system for a geostationary satellite according to the present invention comprises a plurality of outer orbit satellites 22, 24, 32, 34 revolving around the earth in equatorial orbit and polar orbit having higher altitude than that of the geostationary satellite 12; and at least one control station 40, 42, 44, 50 performing orbit determination using tracking data of the outer orbit satellites 22, 24, 32, 34, and then transmitting consequent orbit data to the outer orbit satellites 22, 24, 32, 34.

Figure 4:
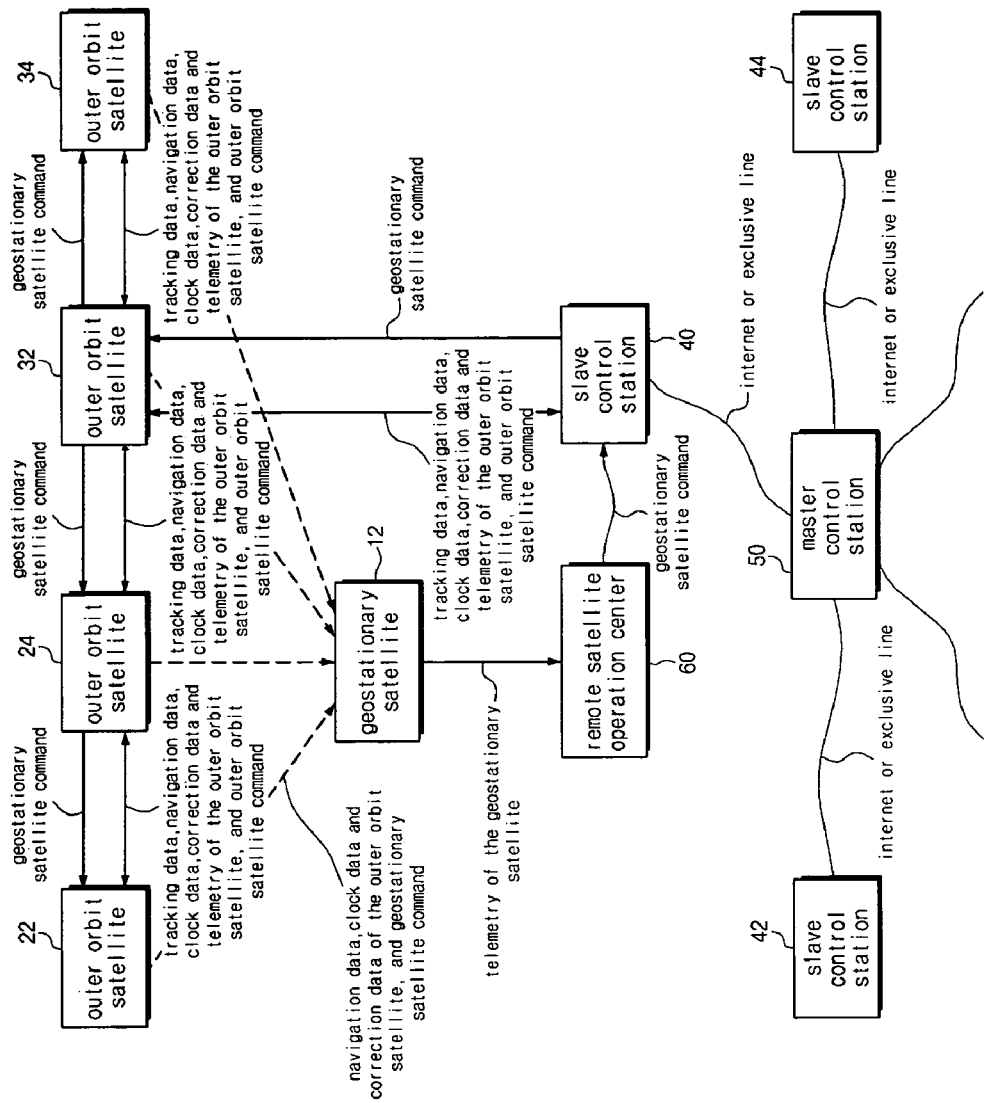
FIG. 4 is a data flow diagram of a positioning system for a geostationary satellite according to a preferred embodiment of the present invention.

Referring to FIGS. 3 and 4, the outer orbit satellites 22, 24, 32, 34 transmit to the geostationary satellite 12 their own navigation data, clock data and correction data generated using the orbit data received from the control station 40. Examples of the navigation data are position data, health data, and so on. Also, examples of the clock data are synchronized clock data, universal time coordinated (UTC), and so on. Further, examples of the correction data are delay error correction data of ionosphere, delay error correction data of the atmosphere, and so on.

The geostationary satellite 12 calculates its own position using the navigation data, the clock data and the correction data, and performs position control and attitude control autonomously with onboard sensors and actuators.

Referring to FIGS. 3 and 4, it is preferable that the control station 40 transmits to the outer orbit satellites 22, 24, 32, 34 geostationary satellite command that orders the geostationary satellite 12 to check the status such as position, attitude, temperature, power and so on, or to make a predetermined motion using actuators, processors and so on, and then the outer orbit satellites 22, 24, 32, 34 transmit the geostationary satellite command to the geostationary satellite 12.

As methods of receiving the telemetry of the geostationary satellite 12 when the geostationary satellite 12 encrypts and transmits the telemetry to the ground, two methods are possible. One is that a remote satellite operation center 60, not the control station 40 receives the telemetry, and the other is that the control station 40 receives the telemetry.

When the remote satellite operation center 60 receives the telemetry, it is preferable that the remote satellite operation center 60 is connected to the control station 40 with the Internet or exclusive line, and transmits the geostationary satellite command to the outer orbit satellites 22, 24, 32, 34. Further, it is preferable that the remote satellite operation center 60 receives encrypted telemetry together with communication or broadcasting service data from the geostationary satellite 12, and it is more preferable that the remote satellite operation center 60 comprises a small receiving antenna for satellite broadcasting such as a home satellite antenna. Meanwhile, the control station 40 can receive the encrypted telemetry of the geostationary satellite 12 directly.

Figure 1:
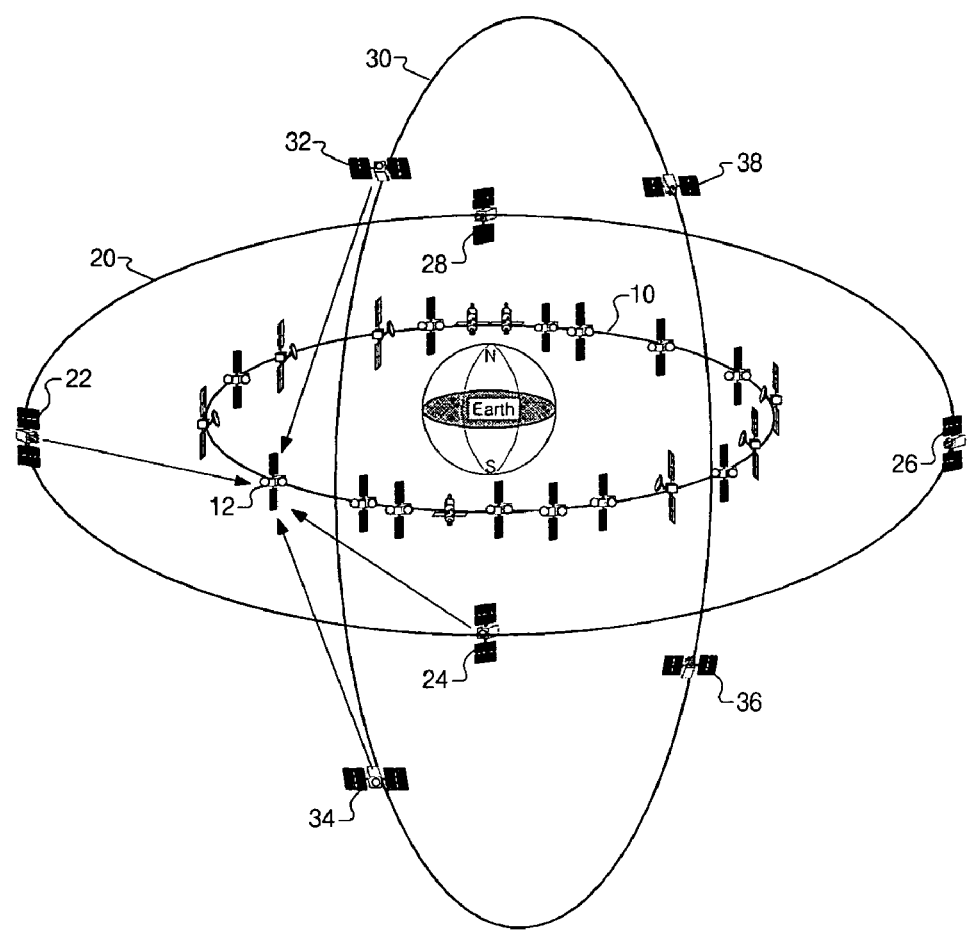
FIG. 1 is a view showing configuration of a positioning system for a geostationary satellite according to a preferred embodiment of the present invention.
Figure 2:
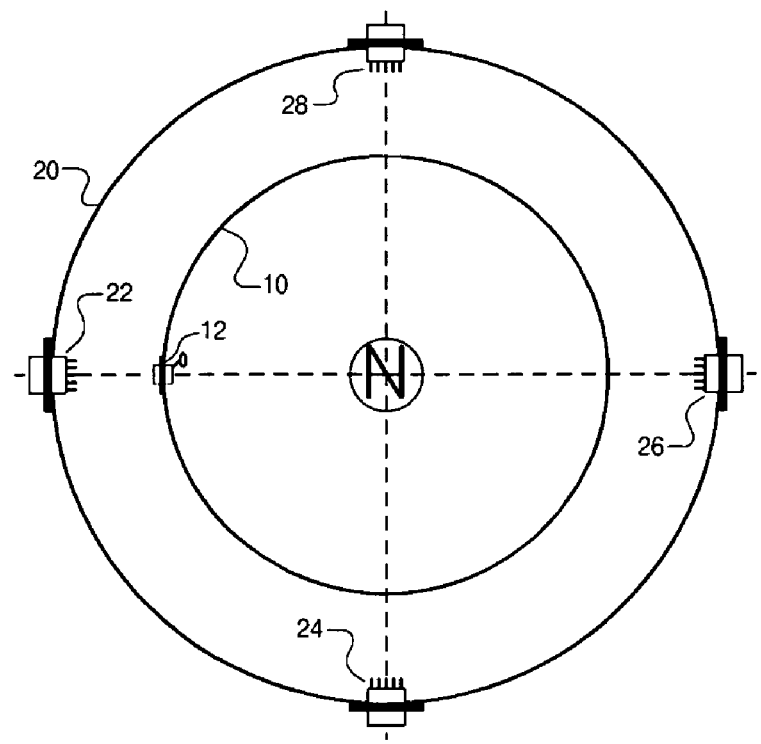
FIG. 2 is a view seen from the North Pole direction and equatorial direction respectively.
Figure 2:
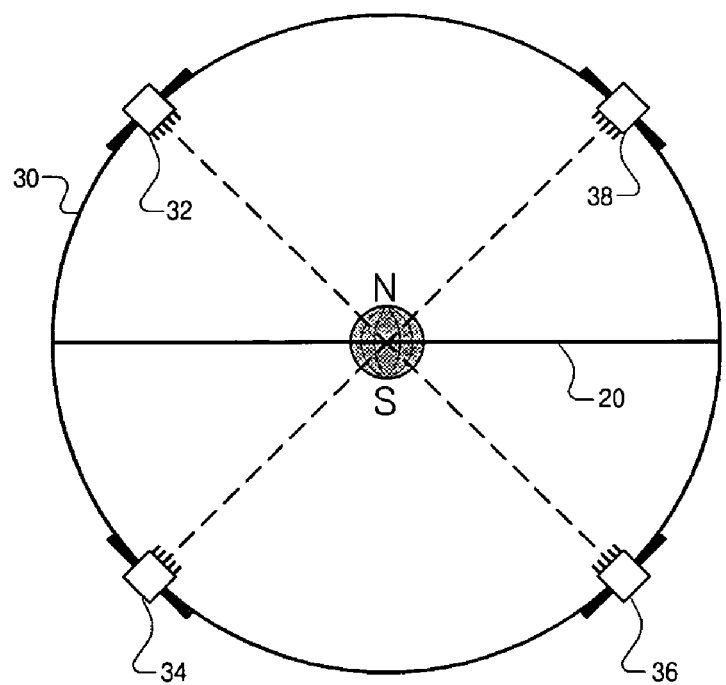

Referring to FIGS. 1 and 2, it is preferable that the outer orbit satellites 22, 24, 26, 28, 32, 34, 36, 38 revolve around the earth in circular orbits 20, 30 with the period of 1.5 to 2.5 days, and more preferable with the period of 2 days (semi-major axis: about 66,900 km). If the period is shorter than 1.5 days, precision is lowered because the outer orbit satellites 22, 24, 26, 28, 32, 34, 36, 38 become close to the geostationary satellite 12, and danger of collision with geostationary satellites disused is increased. If the period is longer than 2.5 days, transmitting power should be increased because the altitude of the outer orbit satellites 22, 24, 26, 28, 32, 34, 36, 38 becomes high and so the distance from the geostationary satellite 12 becomes long, and launching cost of the outer orbit satellites is increased. Meanwhile, unexplained reference number 10 in FIGS. 1 and 2 represents orbit of the geostationary satellite 12.

It is preferable that the number of the outer orbit satellites 22, 24, 26, 28, 32, 34, 36, 38 in equatorial orbit and polar orbit is 4 respectively, because baseline for triangulation of east-west direction and north-south direction becomes distant and so more precise position determination become possible.

Referring to FIG. 2, it is preferable that the outer orbit satellites 22, 24, 26, 28 in equatorial orbit and the outer orbit satellites 32, 34, 36, 38 in polar orbit are arranged to have phase difference of 45° when the number of the outer orbit satellites 22, 24, 26, 28, 32, 34, 36, 38 in equatorial orbit and polar orbit is 4 respectively. This is not only for prevention of collision and radio wave interference among the outer orbit satellites 22, 24, 26, 28, 32, 34, 36, 38 in equatorial orbit, but also for providing precise position data to the geostationary satellite 12.

Meanwhile, it is possible that the number of the outer orbit satellites in equatorial orbit and polar orbit is 3 or other number respectively.

Referring to FIGS. 3 and 4, the control station 40 performs orbit determination using tracking data for the outer orbit satellites 22, 24, 32, 34, and then transmitting consequent precise orbit data to the outer orbit satellite 22, 24, 32, 34. The control station 40 performs orbit determination for the geostationary satellite 12 in prior art, but it performs orbit determination for the outer orbit satellites 22, 24, 32, 34 in the present invention as described above. The present invention has higher precision of position determination than prior art has. This is because the outer orbit satellites 22, 24, 32, 34 look moving when they are observed from the control station 40 because of their revolution periods larger than 1 day, the earth's rotation period, whereas the geostationary satellite 12 looks stopped because of its revolution period of 1 day.

Referring to FIG. 3, it is preferable that the control stations 40, 42, 44, 50 comprise a master control station 50 and at least one slave control station 40, 42, 44, and it is more preferable that slave control stations 40, 42, 44 are distributed worldwide. The master control station 50 and the slave control stations 40, 42, 44 acquire tracking data of the outer orbit satellites 22, 24, 32, 34, and the master control station 50 collects the tracking data, performs orbit determination using the tracking data, and then transmits consequent orbit data to the outer orbit satellites 22, 24, 32, 34 directly or via the slave control stations 40, 42, 44.

Figure 5:
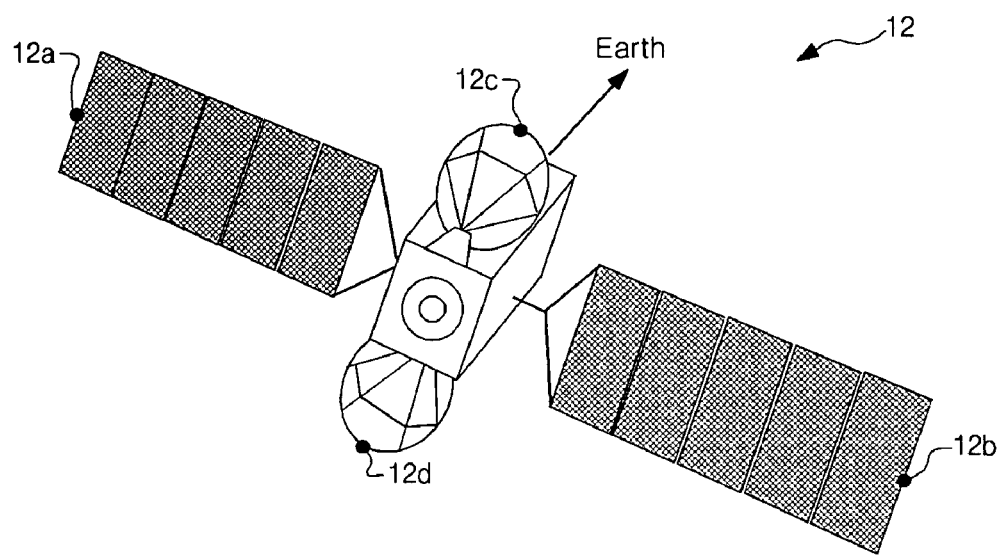
FIG. 5 is a perspective view showing the position of receivers in a geostationary satellite.

Referring to FIG. 5, it is preferable that the geostationary satellite 12 has receivers 12a, 12b, 12c, 12d for receiving navigation data, clock data, correction data and geostationary satellite command from the outer orbit satellites 22, 24, 32, 34 on the tips of reflectable communication antennas and solar panels.

Hereinafter, referring to FIG. 4, data flow of a positioning system for a geostationary satellite according to a preferred embodiment of the present invention will be explained in detail.

The master control station 50 and the slave control stations 40, 42, 44 distributed worldwide acquire tracking data for the outer orbit satellites 22, 24, 32, 34 observable. And the master control station 50 collects the tracking data, performs precise orbit determination using the tracking data, and then transmits consequent orbit data to the outer orbit satellites 22, 24, 32, 34 directly or via the slave control stations 40, 42, 44. The outer orbit satellites 22, 24, 32, 34 that have received the orbit data are cross-linked and share information. In FIG. 4, outer orbit satellite command means the command that orders the outer orbit satellites 22, 24, 32, 34 to check the status such as position, attitude, temperature, power and so on, or to make a predetermined motion using actuators, processors and so on.

The outer orbit satellites 22, 24, 32, 34 transmit navigation data, clock data, correction data and geostationary satellite command to the geostationary satellite 12 with radio waves or laser, etc. The slave control station 40 can transmit the geostationary satellite command to the outer orbit satellites 22, 24, 32, 34, or the remote satellite operation center 60 can transmit the geostationary command to the outer orbit satellites 22, 24, 32, 34 by connecting to the master control station 50 or the slave control station 40 with the Internet or exclusive line. The outer orbit satellites 22, 24, 32, 34 that have received the geostationary satellite command transmit it to the geostationary satellite 12.

The geostationary satellite 12 that has received the geostationary satellite command operates actuators, processors, etc., or encrypts and transmits its own telemetry to the remote satellite operation center 60 or the control stations 40, 42, 44, 50 with communication or broadcasting service data. Thus, the operator of the geostationary satellite 12 can check its status even in his house with a small receiving antenna for satellite broadcasting.

The geostationary satellite 12 calculates its position in real time using navigation data, clock data and correction data transmitted from 4 outer orbit satellites 22, 24, 32, 34. On the basis of position data calculated thus, the geostationary satellite 12 can perform precise position control and attitude control autonomously by onboard sensors and actuators without aid of its own control station until the geostationary satellite's life is over.

The present invention is very useful in position determination for a geostationary satellite requiring precise position determination such as observation of the earth, because it uses outer orbit satellites having higher altitudes than that of the geostationary satellite and so performs position determination for the geostationary satellite with accuracy of a few meters in real time, whereas a conventional global positioning system (GPS) is not useful in position determination for a geostationary satellite having higher altitude than that of GPS satellite, because the GPS satellite has narrow beam and its antennas towards the earth.

In addition, according to the present invention, initial investment cost and maintenance cost for the control station and manpower, required to control the geostationary satellite, are hardly needed, because the geostationary satellite can control itself by onboard computer without aid of the control station until its life is over.

Further, the present invention is very economical and convenient, because the operator of the geostationary satellite can use the Internet or exclusive line in order to transmit command, and can use a small receiving antenna for satellite broadcasting in order to receive telemetry and check the status of the geostationary satellite.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims.

What is claimed is:

1. A positioning system for a geostationary satellite comprising:
   a plurality of outer orbit satellites revolving around the earth in equatorial orbit and polar orbit having higher altitude than that of the geostationary satellite; and
   at least one control station performing orbit determination using tracking data for the outer orbit satellites, and then transmitting consequent orbit data to the outer orbit satellites;
   the outer orbit satellites transmitting to the geostationary satellite their own navigation data, clock data and correction data generated using the orbit data received from the control station, the geostationary satellite calculating its own position using the navigation data, the clock data and the correction data, and performing position control and attitude control autonomously with onboard sensors and actuators.

2. The positioning system of claim 1, wherein the control station transmits to the outer orbit satellites geostationary satellite command that orders the geostationary satellite to check the status or to make a predetermined motion, and then the outer orbit satellites transmit the geostationary satellite command to the geostationary satellite.

3. The positioning system of claim 2, wherein the geostationary satellite encrypts and transmits its own telemetry to a remote satellite operation center, not the control station.

4. The positioning system of claim 3, wherein the remote satellite operation center is connected to the control station with the Internet or exclusive line, and transmits the geostationary satellite command to the outer orbit satellites via the control station.

5. The positioning system of claim 3, wherein the remote satellite operation center receives encrypted telemetry together with communication or broadcasting service data from the geostationary satellite.

6. The positioning system of claim 5, wherein the remote satellite operation center comprises a receiving antenna for satellite broadcasting.

7. The positioning system of claim 2, wherein the geostationary satellite encrypts and transmits its own telemetry to the control station.

8. The positioning system of claim 1, wherein the outer orbit satellites revolve around the earth in circular orbit with the period of 1.5 to 2.5 days.

9. The positioning system of claim 8, wherein the outer orbit satellites revolve around the earth in circular orbit with the period of 2 days.

10. The positioning system of claim 1, wherein the number of the outer orbit satellites in equatorial orbit and polar orbit is 3 or 4 respectively.

11. The positioning system of claim 10, wherein the outer orbit satellites in equatorial orbit and the outer orbit satellites in polar orbit are arranged to have phase difference of 45° when the number of the outer orbit satellites in equatorial orbit and polar orbit is 4 respectively.

12. The positioning system of claim 10, wherein the outer orbit satellites are cross-linked and share information.

13. The positioning system of claim 1, wherein the control station comprises a master control station and at least one slave control station, the master control station and the slave control station acquiring tracking data of the outer orbit satellites, and the master control station collecting the tracking data, performing orbit determination using the tracking data, and then transmitting consequent orbit data to the outer orbit satellites directly or via the slave control station.

14. The positioning system of claim 1, wherein the geostationary satellite has receivers for receiving the navigation data, the clock data, the correction data and geostationary satellite command from the outer orbit satellites on the tips of communication antennas and solar panels.

* * * * *